May 26, 1953 R. L. CARR 2,639,981
APPARATUS FOR MIXING HYPOCHLORITE SOLUTIONS
Filed May 23, 1950
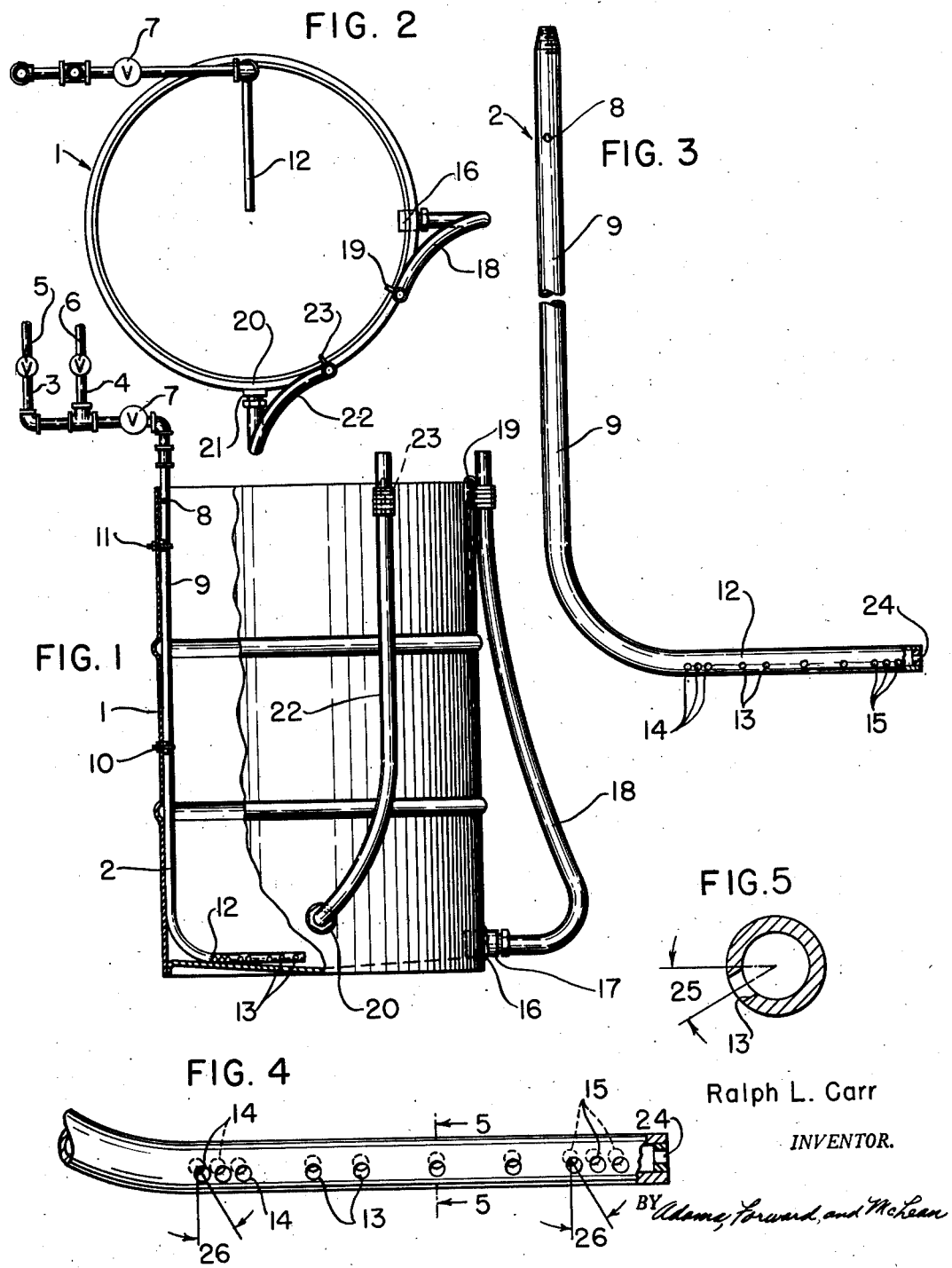
Ralph L. Carr
INVENTOR.
BY Adams, Forward, and McLean
ATTORNEYS Patented May 26, 1953

2,639,981

UNITED STATES PATENT OFFICE 2,639,981

APPARATUS FOR MIXING HYPOCHLORITE SOLUTIONS

Ralph L. Carr, Jackson Heights, N. Y., assignor to Mathieson Chemical Corporation, a corporation of Virginia Application May 23, 1950, Serial No. 163,604

3 Claims. (Cl. 23—271)

This invention relates to improved apparatus for preparing solutions of chemicals, in particular calcium and sodium hypochlorites. For example, in laundering, water sanitation and other processes, it is important to utilize solutions of uniform concentration but it is difficult or expensive to prepare such solutions batchwise under the conditions of commercial operation using apparatus heretofore available.

Generally, hypochlorites used for commercial processes are dissolved in large quantities of water to obtain solutions having concentrations of the order of 1% of hypochlorite. The low solubility of some hypochlorites in water requires substantial agitation and careful temperature control of the water in order to secure a satisfactory solution. Insufficient agitation or improper water temperature results in hypochlorite solutions of doubtful concentrations and in excessive sludge residue. Heretofore the means used to obtain the desired solution have comprised dissolving the hypochlorites by manual stirring or by the use of mechanical agitators of various types. The low rate of solubility of some hypochlorites requires thorough stirring to obtain complete solution and to avoid waste of undissolved hypochlorite. Stirring frequently may be inadequate because of the effort involved, the cost of sufficiently agitating the solution by mechanical means or because of the time required to dissolve the hypochlorite completely.

Solubility of hypochlorites is greatly affected by the temperature of the water used to make the solution, and the rate of solubility is materially affected by the method of adding the chemical to the water and the quantities added at any particular moment during the operation. Water temperatures which are satisfactory in dissolving calcium hypochlorite, for example, will be undesirable in obtaining solutions of sodium hypochlorite. Generally calcium hypochlorite dissolves satisfactorily in water having a temperature range of the order of 75 to 95° F. In order to obtain sodium hypochlorite solutions, on the other hand, an initial water temperature in the range of about 100 to 120° F. is preferable to permit proper coaction between calcium hypochlorite and soda ash and a final temperature range after the addition of soda ash of 75 to 95° F. is desirable. Adding hypochlorites to the water in excess of the amount soluble therein results in excess sludge.

The present invention provides a simple, economical and easily controllable apparatus for preparing hypochlorite solutions. Water, heated to a predetermined temperature is used both as solvent and as the agitating means to secure rapid solution with minimum sludge and to prepare reproducible solutions of uniform concentration. In the use of my apparatus I initially add the required amount of hypochlorite to a small quantity of water heated to a predetermined temperature, such addition being made substantially at the point of the water inlet where the agitation is most violent and then completing the addition of the required amount of the water while continuing the agitation. The water is then shut off and the solution is allowed to remain quiet thereby permitting the insoluble precipitate to settle to the bottom of the container. The desired solution above the level of the precipitate can then be withdrawn. In accordance with my invention a nice temperature control may be maintained which will result in rapid solubility, rapid settling and minimum sludge residue.

My improved solution tank essentially comprises a container of a size suitable for the quantity of the solution desired. Any size or shape of container and any material which will resist corrosion by the hypochlorite may be used. Advantageously, a standard 55-gallon open end steel drum may be used as an inexpensive and easily obtainable container. Experiments have shown that such a drum can be protected from the corrosive action of hypochlorite solutions by applying a number of coats of protective covering such as, for example, plastic paints of which Tygon paint is an illustration. Several coats of such plastic paint provide smooth finish which effectively resists hypochlorite attack. In the side of the container and as close to the bottom as the structure of the vessel will permit, I provide an outlet to draw off the sludge residue. This outlet may be any convenient size to accommodate a conventional fitting. On the standard 55-gallon drum, I preferably use an outlet of about 1¼ inches in diameter. A clear liquor draw-off is provided at a convenient point above the sludge outlet to permit removing the clear liquor into a suitable vessel for use. The clear liquor draw-off may be any size and shape suitable to accommodate a conventional fitting. Preferably, this draw-off, in the 55-gallon drum, is placed about ¾-inch higher than the sludge draw-off and at some distance to one side thereof. This ¾-inch spacing allows for the varying sludge depth which results from making a 30 to 50-gallon batch of hypochlorite in accordance with my invention.

The sludge draw-off fitting may be connected to any suitable means of disposal and the clear liquor draw-off fitting may be connected by any suitable means to a receiving vessel. Advantageously, I use a rubber hose which is not affected by the corrosive action of hypochlorites and which, when the loose end thereof is elevated to a point above the liquid level, also acts as a shutoff means, thus avoiding the necessity of providing corrosion proof valves.

Within the container I place a tube preferably of stainless steel, or other metal resistant to the corrosive action of hypochlorites, having a 90° bend at one end so as to accommodate the tube within the drum. This bend forms a longer leg and a shorter foot and for use in the standard 55-gallon drum, the leg is about 36 inches long, reaching above the rim of the drum while the foot is 9 inches long. Orifices are provided along one side of the foot so that water forced through the tube under suitable pressure is ejected at desired angles to the foot and to the bottom of the container. Tubes having orifices of this kind are generally known as sparger tubes and the foot portion of the tube which I provide is such a sparger tube and the tube will hereafter be referred to as such.

Since only the portion of the tube with the orifices is strictly a sparger tube the L shape which I provide is a matter of convenience, and this tube might otherwise be a straight tube passing through the side of the drum in an opening provided for it. The sparger tube for use in the 55-gallon drum is provided with a number of orifices along the side of the foot, substantially along the center line and in the capped tip. I find that about 10 orifices along the side are convenient and permit grouping to improve turbulence. These orifices are about $\frac{3}{32}$ of an inch in diameter and are placed at about 1-inch centers except for the orifices immediately adjacent to the bend in the sparger tube and the orifices immediately adjacent to the capped end of the sparger tube where three of such orifices are placed at about ¼-inch centers. In order to obtain maximum turbulence, the orifices in the side of the foot of my sparger tube are drilled so that the axes of the group immediately adjacent to the bend of my sparger tube and immediately adjacent to the tip incline at an acute angle forwardly towards the tip and downwardly towards the bottom of the drum. The axes of the remaining orifices in the side of my sparger tube incline at an acute angle downwardly towards the bottom of the drum. The angle in which the orifices are slanted in the desired direction may be in the range of 15 to 30° but preferably is about 20° from the perpendicular to the axis of the foot of the sparger tube where the direction is forwardly or 20° from the horizontal to the axis of the foot of the sparger tube when the direction is downwardly. Placing the orifices in the grouping described and at the angles described provides maximum agitation of the water at the critical point of addition of the hypochlorite.

At a point above the maximum level of the solution, I provide an additional opening in the sparger tube to act as a vacuum break and to avoid the drawing of the hypochlorite solution up into the sparger tube and from there into the water pipes in the event that a vacuum is created in the water system from which the water is drawn. At the upper end of the sparger tube, I provide a valve to control the quantity of water to be added to the solution tank. This valve in turn is connected to a hot and cold water line through conventional means so constructed as to permit separate control of the hot and cold water intake to secure water of desired temperature. Thermometer means for determining such temperature are not described but may be of any suitable type which will permit the operator to observe the temperature of the water employed in making the solution.

For both the sludge and the clear liquor drain-off means, I prefer to use rubber tubing of a length which will permit the loose end to be detachably mounted to the upper portion of the drum so that the loose end of the tube may, when required, be detached and lowered to a point where the liquid will be drained. For convenience, the solution tank can be placed upon a platform so that it can be emptied by gravity. My apparatus invention will be more fully understood from the following description with reference to the accompanying drawings wherein:

Figure 1 is an elevation of the solution tank partially in section.

Figure 2 is a plan view of the solution tank.

Figure 3 is an elevation of the sparger tube.

Figure 4 is an elevation, partially in section, of a part of the sparger tube, showing the orifices in detail.

Figure 5 is a cross section of the sparger tube taken at 5—5 in Figure 4.

Referring to Figure 1, my preferred container for the solution tank is the 55-gallon steel drum generally shown at 1. Positioned in this drum is the sparger tube 2 communicating at its upper end with the hot and cold water lines 3 and 4. These lines are controlled by valves 5 and 6 and the quantity of water flowing into the sparger tube is controlled by valve 7. Near the top of the leg of the sparger tube and above the liquid level in the drum is a vacuum-breaking orifice 8 which may be a hole about $\frac{3}{32}$-inch in diameter. The leg 9 of the sparger tube is affixed to the drum at convenient points which are shown at 10 and 11 but any conventional means of securing a tube to the wall of the drum may be employed. The foot 12 of the sparger tube rests on the bottom of the drum but, if desired, may be slightly raised to clear the bottom so that the sludge residue may be more easily removed. The orifices in the foot of the sparger tube are shown generally at 13 with the preferred grouping of the orifices as indicated at 14 and 15. The sludge draw-off 16 is provided with the conventional fitting 17 which advantageously is made of corrosion-proof material. Attached to this fitting is the tube 18 which may be a rubber or flexible plastic hose of sufficient length to reach the disposal facility for the sludge. The hook at 19 provides a simple means to hold the hose above the liquid level during the period that the tank is filled with solution and causes the tube to act as a shut-off means. The clear liquor draw-off 20 is provided in like manner as the sludge draw-off with a conventional fitting 21, tube 22 and hook 23.

Figure 4 is a detailed view of the sparger tube showing the direction of the orifices. The orifices 14 and 15 are shown at angle 26 pointing about 20° forwardly towards the tip of the sparger tube and 20° downwardly and outwardly towards the bottom of the drum. The orifices 13 are shown in Figure 5, an angle 25 pointing about 20° downwardly and outwardly towards the bottom of the drum. This causes the streams of water when projected from the foot of the sparger tube to strike the bottom and sides of the drum resulting in a swirling action producing the desirable turbulence. The orifice 24 in the capped tip of the sparger tube also adds to such turbulence. Temperature recording means, not shown, may be provided to assist in maintaining desired temperature ranges in the water used in making the solution. As the preparation of a solution of calcium hypochlorite differs from that of preparing a solution of sodium hypochlorite, a different procedure necessarily must be followed in each case.

In operating my apparatus to obtain approximately a 1% solution of calcium hypochlorite, valves 5 and 6 of my apparatus are opened respectively until the water temperature is within the range of 75 to 90° F. and the maximum available water pressure consistent with maintaining such temperature is obtainable. When the solution tank is filled with 2 or 3 inches of water, the required amount of calcium hypochlorite is slowly added to the water at the point where the water is ejected from the sparger tube and maximum turbulence exists. To obtain a 1% solution of calcium hypochlorite, approximately 6 pounds of calcium hypochlorite may be used for each 50 gallons of water. After the required amount of water has been added to obtain the desired quantity of the solution, the valve 7 is turned off and the solution is allowed to stand for a sufficient time to permit the insoluble precipitate to settle. It will be found that this precipitate settles much more rapidly than when the solution is prepared in apparatus heretofore employed. After the precipitate has settled, the clear liquor of the solution may be withdrawn through the draw-off 29.

To obtain a 1% solution of sodium hypochlorite, the valves 5 and 6 should be opened respectively until the water temperature is in a range of 100 to 120° F. When the solution tank is filled with 2 or 3 inches of water, the required amount of calcium hypochlorite is added to the water at the point of maximum turbulence and the solution tank is then filled, approximately ⅓ full. At that point the cold water is turned on without turning off the hot water, effecting a reduction in the temperature of the inlet water. A predetermined amount of soda ash is then added to the solution. The hot water is shut off and the cold water left on at full pressure and the tank is filled to the required volume. The final water temperature should be in the range of 75 to 95° F. The solution is then allowed to remain quiet for approximately 45 minutes to permit the resulting insoluble calcium carbonate to settle. The clear liquor may then be withdrawn from the tank. Approximately 6 pounds of calcium hypochlorite and 4½ pounds to 5 pounds of soda ash will result in a 1% solution of sodium hypochlorite when added to 50 gallons of water in accordance with my invention.

By the present invention, solutions of calcium or sodium hypochlorite may be obtained which are suitable for laundry, water sanitation and other uses.

I claim:

1. An apparatus for preparing hypochlorite solutions comprising a container capable of holding liquids, a draw-off outlet in the side wall of the container near the bottom thereof, a second draw-off outlet located at a point vertically higher on the side wall than the first draw-off, communicating means connected to each draw-off outlet to permit a withdrawal of the contents of the container, means for controlling such withdrawal, a sparger tube mounted adjacent the bottom of said container and extending from a point at the periphery of said container to the middle portion thereof, said sparger tube having an end tip positioned at said middle portion; said sparger tube having a plurality of orifices along one side thereof, the orifices of the sparger tube at the end portion near the periphery of the container and at the end portion near said end tip being inclined downwardly at a predetermined angle toward the bottom of said container and forwardly at a predetermined angle toward the sparger tube tip, the orifices at the middle portion of said sparger tube being inclined downwardly toward the bottom of said container; and fluid supply means connected to said sparger tube for conducting a fluid thereto for passage through said orifices to create and maintain a swirling motion in fluid in said container.

2. An apparatus in accordance with claim 1 in which said end tip has an orifice for directing fluid across the bottom of said container and said fluid supply means has a vacuum breaking orifice located above the level of fluid in said container to prevent flow of fluid back into said fluid supply means.

3. An apparatus in accordance with claim 1 and including valve means connected to said fluid supply means whereby the temperature and pressure of the fluid admitted to the container through the sparger tube may be controlled.

RALPH L. CARR.

References Cited in the file of this patent

UNITED STATES PATENTS

| Number | Name | Date |
|---|---|---|
| 98,425 | Shaffner | Dec. 28, 1869 |
| 686,059 | Hartshorne et al. | Nov. 5, 1901 |
| 881,434 | Moburg | Mar. 10, 1908 |